Patented May 31, 1949

2,471,474

UNITED STATES PATENT OFFICE 2,471,474

METHOD FOR CLARIFYING AND PURIFYING VEGETABLE BEVERAGES

Ralph T. Alba and James S. Wallerstein, New York, N. Y., assignors, by mesne assignments, to Wallerstein Company, Inc., New York, N. Y., a corporation of New York No Drawing. Application February 10, 1945,
Serial No. 577,330

15 Claims. (Cl. 99—52)

The present invention relates to an improved method for the clarification and purification of beverages derived from vegetable sources, such as fruits and grains, both fermented and unfermented.

It is the general object of the invention to provide a process for the clarification and purification of beverages of various kinds by additions of such character that the taste, flavor and appearance of the beverage are not only not impaired by the use of the additions, but are definitely improved.

It is a further object of the invention to provide a method for the clarification and for the purification of beverages whereby not only solid suspended material may be removed, but also certain dissolved or colloidally suspended substances which cannot be removed by filtration.

More specifically it is the object of the invention to effect clarification and purification of beverages by the addition thereto of a water-soluble form of lignin obtained by the alkaline cooking of ligneous woods, and of a proteinaceous material which, while more or less soluble or colloidally suspendible in water, is of such character as to be coagulated or otherwise insolubilized by the ligneous material so as to produce a slowly settling precipitate which mechanically and by adsorption and perhaps also absorption brings down with it various suspended matters in the beverage.

Other objects and advantages of the invention will appear as the following more detailed description of the invention proceeds.

We have found that water-soluble alkali-cook lignins combine with protein to form a precipitate which, according to the invention, is utilized to effect purification of a beverage to which these materials are deliberately added. The precipitation takes place slowly and the gradual sedimentation of the protein-lignin complex acts as a fining material promoting and effecting the removal from the solution of suspended matter, the whole mass being deposited in a layer at the bottom of the treating vessel. The protein-lignin complex is highly adsorbent, and as it precipitates, it removes not only any suspended solid but also various impurities including coloring material, so that the final solution is of a lighter color. If the liquor of vegetable origin contains nitrogenous or proteinaceous substances which are coagulated or combined with the ligneous material to form an insoluble complex, lignin complexes may likewise function in the clarification and stabilization step just described.

In carrying out our process, the amounts of the ligneous and protein materials are so determined that no appreciable remainder of either of these substances is left behind in solution. To insure against contaminating the beverage or other vegetable extract, infusion, decoction, or the like, the relative combining proportions of any particular ligneous material and proteinaceous substance employed are first determined by preliminary experiments, as will be evident to chemists, and such combining proportions are employed in clarifying a solution of vegetable origin in accordance with the invention, except that where the solution contains nitrogenous or proteinaceous or other substances which are precipitated by the lignin solution, which can be determined by treating a sample of the vegetable solution with the lignin solution, corresponding reduction should be made in the amount of added protein material. The precipitate formed tends to settle more or less completely at the bottom of the vessel, so that the clarified beverage can be separated from the precipitate by simple decantation: however, the separation can be effected also by centrifugation or filtration.

The form of lignin preferably employed by us is one that is soluble in relatively highly alkaline aqueous solutions (for example, at a pH value of about 9.5–12), but is insoluble at or near the neutral point and particularly under acid conditions.

The alkali-soluble form of lignin employed should be free from impurities which might affect the flavor of the vegetable solution. This may be accomplished, for example, by the successive heating of alkali-soluble but acid-insoluble forms of lignin, in dilute alkaline solution followed by filtering off insoluble matter and then precipitating the lignin by the addition of excess acid and washing the precipitate free from acid. The lignin precipitate is then dissolved in a sodium hydroxide or other alkaline solution. This purification may be repeated several times until all substances which might remain behind in solution in the vegetable beverage are eliminated. Purification may also be achieved by other known methods, as, for example, by dialysis, or by extraction with various solvents.

The alkali-cook, water-soluble lignin material employed in the present invention is produced in known manner during the alkaline cooking of cipitated by neutralizing the alkali as, for example, by passing through carbon dioxide gas (see, for example, E. B. Brookbank, "Recovery and uses of by-product soda lignin," Chemurgic Digest, June 30, 1943) and dried after removal from the solution.

This type of material represents the lignin matter used in our invention. Such lignins, while soluble in mild alkalies, are insoluble under acid and neutral conditions. However, when the alkali-dissolved lignin is added to a slightly acid beverage at any stage in the course of manufacture thereof, the conversion into the insoluble state takes place relatively slowly, so that the undesirable components of the beverage are subjected to the action of both the soluble form and the insoluble form of the lignin, i. e., to both a primarily chemical as well as to both a primarily physical (adsorbing) action.

An important advantage in the alkali cook lignin as compared to other forms of water soluble lignin is that it is able to cause a complete precipitation of the turbidity-forming substances at the low temperature and at the pH's (pH 3.8–4.5) which prevail during the storage period of beer.

Although a very wide variety of proteins may be employed for the production of the protein-lignin according to the invention, it is advantageous to utilize a protein which is readily soluble and forms a homogeneous solution; and, preferably, a proteinaceous material is employed which is either completely precipitable by lignin under neutral or acid conditions or leaves behind in solution only substances which do not affect the taste, flavor or color of the vegetable solution. Our preferred protein is gelatin, but other proteins like casein, egg albumin and likewise vegetable proteins which meet the above-mentioned requirements, can be employed, such as suitably purified soya bean proteins, soluble cereal proteins, and the like.

We have found it to be advantageous first to mix the lignin with the solution to be purified and thereafter to add the gelatin. Precipitation takes place slowly, and at 20° C. may require 12–24 hours for complete clarification. The sedimentation of the protein-lignin complex and the resulting clarification are speeded at higher temperatures. Moderate heating, say to about 60° C., followed by immediate cooling, have been found not to affect the flavor of vegetable beverages.

For complete removal of the added materials, and for effective precipitation, it is generally advantageous to employ a concentration of approximately 5 parts of protein to 2 parts of lignin. However, for best results, preliminary tests should be made on any particular beverage to be treated, as explained hereinabove.

The amounts of proteins and ligneous material to be added may be adjusted also to control the amount of material which is to be precipitated out of the vegetable solution in the course of the clarification process. Thus larger amounts of the added, mutually precipitating materials, will effect a more thoroughgoing purification of the vegetable liquor and vice versa. In general, however, an adequate concentration will be provided by the adding of 2½ parts of protein and 1 part of the ligneous material (both dry weight) to about 5,000 parts of the vegetable solution. Frequently a still lower proportion will suffice. Highly turbid solutions may require higher quantities of the added materials, the optimum amounts being determined by preliminary experiments in each case.

As already indicated, the proportion of 2 parts of lignin to 5 parts of protein is subject to variation depending upon the nature of the solution to be clarified; and the optimum proportions may be determined in each case by treatment of small samples and observing under what conditions maximum clarification takes place. The proportion of lignin to added protein will be relatively higher if the solution already contains appreciable quantities of precipitable nitrogenous matter as the amount of added protein will in such case be correspondingly reduced.

The alkali-cook lignin, after purification by precipitation with acid, may be dissolved in dilute alkali, for example at a pH of about 9.5–12. The so-dissolved lignin is then added to the neutral or slightly acid beverage. The small quantities of lignin employed will not appreciably affect the pH value of the beverage, but if desired the original pH value of the latter may be restored by the addition of small quantities of a suitable food acid, like lactic acid, to the solution.

The clarification method of the present invention may be applied where only clarity and brilliance are desired and also where the elimination of certain coagulable or otherwise precipitable substances is sought. The process may be applied to fruit juices, like apple or grape juice, or the juice of citrus fruits; and it may also be applied to the clarification of cereal beverages and either before or after fermentation, as, for example, beer and ale. Our process is suitable also for the clarification and purification of vegetable juices like carrot, beet and celery juices, or mixtures thereof.

The following examples describe specific procedures for carrying out the invention, but as will be understood, are presented purely for purpose of illustration and not as indicating the limits of the invention:

*Example 1*

20 liters of apple juice are prepared by grinding and pressing through a standard cider press. A solution of gelatin is obtained by dissolving 5 g. of gelatin in 200 cc. warm water. A second solution is prepared by dissolving 2 g. of alkali-soluble but acid-insoluble lignin, previously purified by treatment with hot dilute alkali and hot dilute acid in 200 cc. water made slightly alkaline in the vicinity of pH 10 by the addition of a few drops NaOH solution.

The lignin solution is added and thoroughly mixed with the apple juice. Thereafter the gelatin is added and thoroughly mixed in turn. The mixture is permitted to stand overnight during which time the protein-lignin complex gradually precipitates, carrying with it substantially all the insoluble matter in the apple juice. The juice may then be decanted or centrifuged free from the insoluble matter and is virtually clear.

Brilliant and rapid filtration may be achieved with the aid of ½% Filter-Cel. The juice may now be pasteurized without loss in brilliancy and is of an excellent taste and flavor. It is of a substantially lighter color than the untreated control and has a purer, clearer taste.

*Example 2*

Beer wort is prepared according to currently known procedures with two parts of malt to one of corn flour, and digested by mashing at appropriate temperatures; the insoluble grains are relution of the precipitate with alkali.
method according to claim 4 wherein the
btained by the alkaline cooking of wood
uble in alkali but is insoluble at neutral
I values.
method according to claim 4 wherein the
d is dissolved at a pH value of approxi-
5-12 and is then added to the beverage.
method according to claim 4 wherein the
ed is dissolved at a pH value of ap-
ely 9.5-12 and is then added to the acid
and thereafter adjusting the pH of the
to its original value by the addition of
d and separating the solution from the
:e.
method according to claim 2 wherein the
is a fruit juice.
method according to claim 2 wherein the
is apple juice.
method according to claim 2 wherein
age is a cereal beverage.
method according to claim 2 wherein
age is a fermented cereal beverage.
method according to claim 2 wherein
nt of gelatin added is approximately two
half times the lignin material.
method according to claim 2 wherein
age is of cereal origin and which has been
to a kettle boil during which a quantity
has been added, and wherein yeast is
the clarified solution after the addition
neous and gelatin materials and separa-
e precipitate.
method according to claim 2 wherein
ous and gelatin materials are added dur-
storage of a fermented wort following
of the yeast.
e method according to claim 2 wherein
1 used is itself preliminarily purified by
t with hot dilute acid and hot dilute
utions to remove impurities.

RALPH T. ALBA.
      JAMES S. WALLERSTEIN.

REFERENCES CITED llowing references are of record in the
is patent:

UNITED STATES PATENTS

| | Name | Date |
|---|---|---|
| 2 | Graham | Aug. 29, 1922 |
| 8 | Krebs | May 11, 1937 | ther references on following page)

unaffected by the additions.

If it is desired to avoid dilution of the beverage, the solution can be partially evaporated in a vacuum to remove the added water, or the reagents may be dissolved first in separate portions of the beverage and such portions then added to the main body of the beverage solution.

As will be evident from the foregoing, the gelatin and alkali-cook lignin materials may be added at any suitable point in the course of manufacture of a fermented beverage. Thus, in the case of a fermented cereal beverage, they may be added after the kettle boil during which hops have been added, but prior to the addition of the yeast for promoting fermentation; or the mutually precipitating materials may be added to a fermented wort after the removal of the yeast and preliminary to, during or after storage.

We claim:

1. The method of improving fermented beverages of mildly acid nature derived from cereals and normally containing undesirable organic components of proteinaceous nature which are soluble in mildly acid medium but are capable of causing turbidity on changes of temperature, which comprises mixing with the beverage a solution of a lignin obtained by the alkaline cooking of ligneous plant material and insoluble in dilute acid medium, said solution having a pH value of approximately 9.5 to 12, adding to the mixture a solution of gelatin, whereby said organic components are precipitated along with a lignin-gelatin complex, adjusting the pH of the beverage to its original value by the addition of lactic acid, and separating the supernatant from the precipitated material.

2. The method of improving beverages of mildly acid nature derived from vegetable sources and normally containing undesirable organic components of proteinaceous nature which are soluble in the mildly acid beverage but are capable of causing turbidity on changes of temperature, which comprises adding to the beverage a solution of a lignin obtained by the akaline cooking of ligneous plant material and insoluble in dilute acid medium, and a quantity of gelatin sufficient to combine with substantially all of the lignin, whereby said organic components are precipitated along with the formed lignin-gelatin complex while desirable proteinaceous components are left in solution, and subsequently separating the supernatant from the precipitated material.

3. The method according to claim 2, including

UNITED STATES PATENTS

| Number | Name | Date |
|---|---|---|
| 2,108,317 | Miller | Feb. 15, 1938 |
| 2,200,784 | Wallace | May 14, 1940 |
| 2,223,753 | Wallerstein | Dec. 3, 1940 |
| 2,269,315 | Nelson et al. | Jan. 6, 1942 |
| 2,415,439 | Nelson | Jan. 19, 1947 |

OTHER REFERENCES

"American Handy Book of the Brewing, Malting, and Auxiliary Trades," by R. Wahl and M. Henius, 3d edition, vols. I and II, published by Wahl-Henius Institute, 1908, Chicago, page 487, vol. 1, and pages 827, 828, 829, vol. II.

"Water Treatment," article in Chemical Trade Journal and Chemical Engineer, Jan. 16, 1942, page 70.

Industrial Chemistry, by A. Rogers, 3d edition, 1921, published by D. Van Nostrand Co., New York, N. Y., page 940.

The Chemistry of Wood, by Hawley and Wise, 1926, published by Chemical Catalog Co., Inc., New York, N. Y., pages 44, 45, 47, 79.